United States Patent
Park et al.

(10) Patent No.: US 11,803,093 B2
(45) Date of Patent: Oct. 31, 2023

(54) SMART GLASS TRANSMITTANCE CONTROL SYSTEM AND METHOD

(71) Applicants: HYUNDAI MOTOR COMPANY, Seoul (KR); KIA MOTORS CORPORATION, Seoul (KR)

(72) Inventors: Jong Min Park, Seoul (KR); Seung Hyeok Chang, Suwon-si (KR); Ki Hong Lee, Seoul (KR); Nak Kyoung Kong, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 293 days.

(21) Appl. No.: 17/020,156

(22) Filed: Sep. 14, 2020

(65) Prior Publication Data
US 2021/0096438 A1    Apr. 1, 2021

(30) Foreign Application Priority Data
Sep. 26, 2019 (KR) .................... 10-2019-0118586

(51) Int. Cl.
*G02F 1/163* (2006.01)
*G02F 1/00* (2006.01)
*B60J 3/04* (2006.01)

(52) U.S. Cl.
CPC ............... *G02F 1/163* (2013.01); *B60J 3/04* (2013.01); *G02F 1/0018* (2013.01)

(58) Field of Classification Search
CPC .......... G02F 1/01; G02F 1/0121; G02F 1/137; G02F 1/13718; G02F 1/13306; G02F 1/13439; G02F 1/1345; G02F 1/0018; G02F 1/155; G02F 1/15; G02F 1/153; G02F 1/1533; G02F 1/15165; G02F 1/1523; G02F 1/1521; G02F 1/163; G02F 2201/122; B60J 3/04; B60J 1/02; B60J 1/08; E06B 9/24;
(Continued)

(56) References Cited

U.S. PATENT DOCUMENTS 8,125,336 B2   2/2012   Ieda et al.
9,594,285 B2   3/2017   Branda et al.
(Continued)

FOREIGN PATENT DOCUMENTS

CN   101554832 A   10/2009
CN   108430816 A   8/2018
(Continued)

*Primary Examiner* — Jie Lei
(74) *Attorney, Agent, or Firm* — LEMPIA SUMMERFIELD KATZ LLC

(57) ABSTRACT

A smart glass transmittance control system includes: a smart glass that decreases transmittance of the smart glass in response to the quantity of light introduced and increases the transmittance of the smart glass when electric power is applied; a power supply unit to supply the electric power to the smart glass; a control unit to control supply of the electric power from the power supply unit to the smart glass in order to control the transmittance of the smart glass according to a user request. In particular, the control unit controls the supply of the electric power from the power supply unit to the smart glass based on the driving environment of a vehicle, the quantity of light from an external light source, or the driving environment condition of the smart glass.

13 Claims, 6 Drawing Sheets

(58) Field of Classification Search
CPC ... E06B 3/67; E06B 3/6722; E06B 2009/2464
USPC ........ 359/238, 265, 266, 261, 254, 270, 275
See application file for complete search history.

(56) References Cited

U.S. PATENT DOCUMENTS

| | | |
|---|---|---|
| 10,185,199 B2 | 1/2019 | Branda et al. |
| 10,603,988 B2 | 3/2020 | O'keeffe |
| 2009/0256704 A1 | 10/2009 | Ieda et al. |
| 2015/0116808 A1 | 4/2015 | Branda et al. |
| 2016/0077400 A1 | 3/2016 | Lam et al. |
| 2017/0205682 A1 | 7/2017 | Branda et al. |
| 2018/0259804 A1* | 9/2018 | Bae .................. G02F 1/137 |
| 2019/0366811 A1 | 12/2019 | O'keeffe |
| 2020/0026103 A1* | 1/2020 | Logan .................. E06B 9/24 |

FOREIGN PATENT DOCUMENTS

| | | |
|---|---|---|
| CN | 108445661 A | 8/2018 |
| CN | 109466286 A | 3/2019 |
| KR | 10-2006-0092362 A | 8/2006 |

\* cited by examiner

SMART GLASS TRANSMITTANCE CONTROL SYSTEM AND METHOD

CROSS-REFERENCE TO RELATED APPLICATION

This application claims priority to and the benefit of Korean Patent Application No. 10-2019-0118586, filed on Sep. 26, 2019, the entire contents of which are incorporated herein by reference.

FIELD

The present disclosure relates to a smart glass transmittance control system and method, and more particularly to a smart glass transmittance control system and method capable of discoloring or achromatizing a smart glass.

BACKGROUND

The statements in this section merely provide background information related to the present disclosure and may not constitute prior art.

Electrochromism is a phenomenon in which a color is reversibly changed by the direction of an electric field when voltage is applied, and an electrochromic material is a material having optical properties which are reversibly changeable by an electrochemical reduction-oxidation reaction. The electrochromic material has characteristics in which the electrochromic material exhibits no color in the case in which no electrical signal is applied from outside and exhibits a color when an electrical signal is applied or in which the electrochromic material exhibits a color in the case in which no signal is applied from outside and is achromatized when a signal is applied.

An electrochromic device, which is a device using a phenomenon in which transmittance of the electrochromic material is changed by an electrochemical reduction-oxidation reaction, is used to adjust transmittance and reflectance of a window glass for buildings or a vehicle mirror. In recent years, it has been known that an electrochromic device has an infrared blocking effect as well as discoloration within a visible light region, whereby the electrochromic device has attracted great attention as possible energy-saving products.

Furthermore, in recent years, a vehicle glass is manufactured using the electrochromic device in order to provide a smart glass, transmittance of which is adjustable. A conventional smart glass is configured such that transmittance of the smart glass is controlled using polarization technology through control of angular arrangement of materials when electricity is applied to liquid crystals and floating materials.

In a conventional glass or mirror using the electrochromic device, however, the function thereof is deteriorated depending on impurities contained in an electrochromic layer. Furthermore, power must be continuously applied, whereby driving power of a vehicle is reduced.

Furthermore, in the case in which a smart glass configured such that the smart glass is irreversibly discolored in the case in which a light source is present and the smart glass is achromatized only when power is applied is mounted, a new method of controlling transmittance of the smart glass is required.

The above information disclosed in this Background section is provided only for enhancement of understanding of the background of the present disclosure and therefore it may contain information that does not form the prior art that is already known to a person of ordinary skill in the art.

SUMMARY

The present disclosure provides a system and method for controlling a smart glass configured such that transmittance of the smart glass is automatically decreased depending on the quantity of light applied to the smart glass from outside.

Moreover, the present disclosure provides a smart glass transmittance control system and method capable of discoloring and achromatizing the smart glass based on the quantity of external light.

The objects of the present disclosure will be clearly understood from the following description and could be implemented by means defined in the claims and a combination thereof.

In one aspect, the present disclosure provides a smart glass transmittance control system including: a smart glass that decreases transmittance of the smart glass in response to the quantity of light introduced and increases the transmittance of the smart glass when electric power is applied; a power supply unit configured to supply the electric power to the smart glass; a control unit configured to control supply of the electric power from the power supply unit to the smart glass in order to control the transmittance of the smart glass according to a user request; wherein the control unit is configured to control the supply of the electric power from the power supply unit to the smart glass based on a driving environment of a vehicle, the quantity of light from an external light source, or a driving environment condition of the smart glass.

The control unit may be configured to determine the transmittance of the smart glass based on the quantity of light measured by an auto light sensor or an ambient light sensor.

The control unit may be configured to determine the driving environment of the vehicle through a navigation system.

The control unit may be configured to perform control such that power is applied to the smart glass in response to a light blocking area on a driving route of the vehicle through the navigation system.

The control unit may be configured to perform control such that the transmittance of the smart glass increases in the case in which no external light source is present.

In another aspect, the present disclosure provides a method of controlling transmittance of the smart glass configured such that transmittance of the smart glass decreases in response to the quantity of light introduced into a vehicle and the transmittance of the smart glass increases in the case in which electric power is applied. In particular, the method includes: determining, by a controller, a driving environment condition of the smart glass; determining, by the controller, whether the quantity of light introduced is equal to or more than a first reference value in the case in which the driving environment condition is an automatic mode; entering, by the controller, a day mode in the case in which the quantity of light introduced is equal to or more than the first reference value and determining whether the quantity of light introduced exceeds a second reference value; decreasing, by the controller, the transmittance of the smart glass in the case in which the quantity of light introduced exceeds the second reference value; and applying, by the controller, the electric power to the smart glass in the case in which the quantity of light introduced exceeds the second reference value and setting a hysteresis period in the case in which the transmittance of the smart glass is equal to or more than intermediate brightness level.

The method may further include: entering, by the controller, a night mode in the case in which the quantity of light introduced is less than the first reference value, and determining whether the quantity of light introduced is equal to or less than a third reference value; applying, by the controller, the electric power to the smart glass in the case in which the quantity of light introduced is equal to or less than the third reference value, and determining whether the quantity of light transmitted through the smart glass is equal to or more than the third reference value; and turning the electric power off in the case in which the quantity of light transmitted through the smart glass is equal to or more than the third reference value.

The step of applying power to the smart glass and determining whether the quantity of light transmitted through the smart glass is equal to or more than the third reference value may include applying the power to the smart glass in a pulse form in the case in which the quantity of light introduced is equal to or less than the third reference value.

The step of determining the driving environment condition of the smart glass may include determining whether an external light blocking area is present on a driving route of the vehicle and applying maximum power to the smart glass in the case in which the external light blocking area is present on the driving route.

The step of determining the driving environment condition of the smart glass may include determining whether the quantity of light introduced exceeds the second reference value in the case in which the driving environment condition is a self-driving mode or a private mode and determining whether the transmittance of the smart glass is the lowest brightness level in the case in which the quantity of light introduced exceeds the second reference value.

The power may be turned off in the case in which the transmittance of the smart glass is the lowest brightness level.

The step of determining the driving environment condition of the smart glass may include determining whether paling is sensed by at least one of the smart glass or a light quantity sensor and applying power in order to switch the transmittance of the smart glass to the highest state in the case in which the paling is sensed.

The step of determining whether paling is sensed may include generating a paling signal in the case in which the paling is sensed.

The step of determining the driving environment condition of the smart glass may include determining whether the driving environment condition is a parked state in the automatic mode, determining whether the quantity of light introduced in the automatic mode is less than the first reference value and is equal to or less than a third reference value, applying power to the smart glass in the case in which the quantity of light introduced is less than the first reference value and is equal to or less than the third reference value, and turning power off in the case in which the quantity of light transmitted through the powered smart glass is equal to or more than the third reference value and continuously applying power in the case in which the quantity of light transmitted through the powered smart glass is less than the third reference value.

The step of determining the driving environment condition of the smart glass may include determining whether there is user switch input in the case in which the driving environment condition is a manual mode, determining whether the quantity of light introduced is equal to or more than a third reference value in the case in which there is the user switch input, determining whether the quantity of light transmitted through the smart glass is less than the third reference value in the case in which the quantity of light introduced is equal to or more than the third reference value, and applying power in the case in which the quantity of light transmitted through the smart glass is less than the third reference value.

The smart glass transmittance control system may further include turning power off in the case in which the quantity of light transmitted through the smart glass is equal to or more than the third reference value.

The step of determining whether the quantity of light transmitted through the smart glass is less than the third reference value in the case in which the quantity of light introduced is equal to or more than the third reference value may include applying power in the case in which the quantity of light transmitted through the smart glass is less than the third reference value.

The step of determining whether the quantity of light transmitted through the smart glass is less than the third reference value may include turning power off in the case in which the quantity of light transmitted through the smart glass is equal to the third reference value.

The step of determining whether the quantity of light transmitted through the smart glass is less than the third reference value may include displaying impossibility of execution in the case in which the quantity of light transmitted through the smart glass exceeds the third reference value.

The driving environment condition may be measured using at least one of an auto light sensor, a rain sensor, a navigator, or an ambient light sensor located inside the smart glass.

Other aspects and exemplary forms of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The statements in this section merely provide background information related to the present disclosure and may not constitute prior art.

DRAWINGS

In order that the disclosure may be well understood, there will now be described various forms thereof, given by way of example, reference being made to the accompanying drawings, in which.

Figure 1:
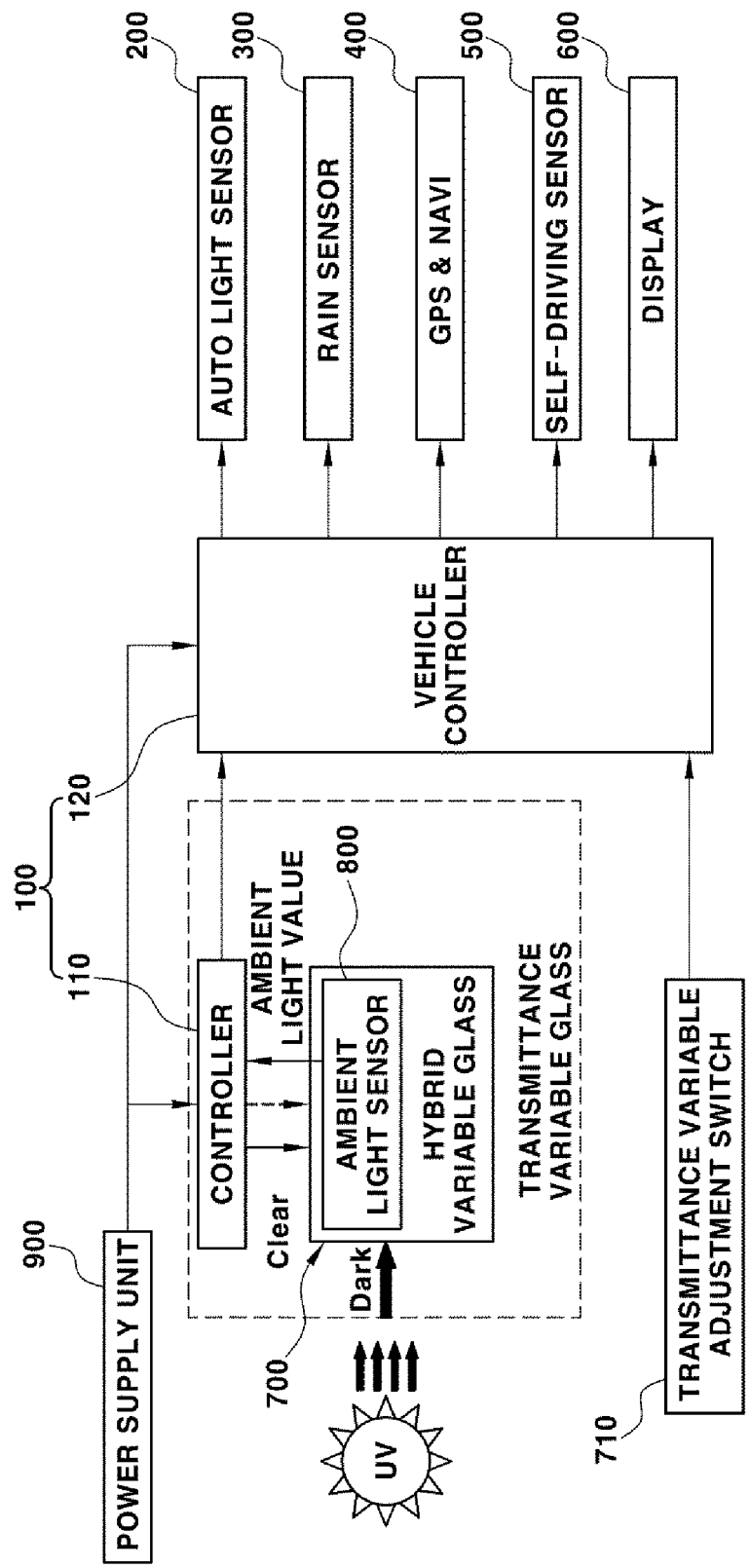
FIG. 1 is a block diagram showing a smart glass transmittance control system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to various forms of the present disclosure, examples of which are illustrated in the accompanying drawings and described below. However, the present disclosure may be embodied in many different forms and should not be construed as limited to the forms set forth herein. Rather, these forms are provided so that this disclosure will be thorough and complete, and will fully convey the scope of the disclosure to those skilled in the art.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes, will be determined in part by the particular intended application and use environment.

In addition, the term "unit," "sensor" or "glass" used in this specification signifies one unit that processes at least one function or operation, and may be realized by hardware, software, or a combination thereof.

In addition, relational terms, such as "first" and "second," are used in this specification only to distinguish between the same elements, and the elements are not limited as to the sequence therebetween in the following description.

In addition, the term "light source" used in this specification includes all constructions configured to apply light to a vehicle. In this specification, sunlight is described as being a light source as one form; however, the light source is not limited thereto.

Also, in this specification, the term "discoloration" means that transmittance of a smart glass is controlled so as to decrease, and the term "achromatization" means that transmittance of the smart glass is controlled so as to increase.

Also, in this specification, transmittance of the smart glass may be defined as meaning the quantity B of light introduced into the smart glass.

The present disclosure relates to a smart glass configured to be discolored in response to the quantity A of light introduced from outside, wherein in the case in which the quantity of light incident from outside, such as the sun, is equal to or more than a second reference value a", the smart glass is discolored such that transmittance of the smart glass decreases.

In addition, in the case in which electric power is applied to the smart glass, the discolored smart glass is achromatized, whereby transmittance of the smart glass increases.

In brief, the smart glass according to the present disclosure is configured to be irreversibly discolored in the case in which a light source is present. In one form, the smart glass is discolored in response to the quantity of light introduced from the light source, and separate power (i.e., electric power) is applied in order to achromatize the smart glass.

FIG. 1 is a view showing coupling between components of a smart glass transmittance control system according to one form of the present disclosure.

A control unit 100 located in a vehicle is configured to measure the quantity of light introduced from outside through an auto light sensor 200 and a rain sensor 300 and to measure whether the vehicle self-drives through a self-driving sensor 500.

In addition, the control unit 100 is configured to be linked to a display unit 600 located inside the vehicle, and is configured to display the current state of a smart glass 700 depending on driving thereof or to perform input for controlling the smart glass 700.

In one form of the present disclosure, the display unit 600 may be configured to display the driving state of the smart glass 700, whether the smart glass is paled, and whether the smart glass is discolored.

In another form, the control unit 100 may be divided into a vehicle controller 120 and a controller 110 configured to control the smart glass 700. The vehicle controller 120 may be configured to be linked to the auto light sensor 200, the rain sensor 300, a navigator 400, and the self-driving sensor 500.

An ambient light sensor 800 is located inside the smart glass 700, and is configured to measure the quantity of light introduced into the vehicle depending on discoloration of the smart glass 700, and is configured to measure the quantity of light introduced into the vehicle from a light source through the smart glass 700 in order to determine transmittance of the smart glass 700.

In addition, the ambient light sensor 800 is connected to the control unit 100 of the vehicle to measure the quantity of light introduced into the vehicle and to perform discoloration or achromatization of the smart glass 700 through the control unit 100 based on the measured light quantity data.

The smart glass controller 110 is connected to the vehicle controller 120 to receive information of the sensors and the navigator 400 located in the vehicle and to perform control such that power is applied to the smart glass 700 through the smart glass controller 110, and is configured to control the discoloration quantity of the smart glass 700 according to a user request.

In addition, the vehicle controller 120 is configured to be linked to a transmittance variable adjustment switch 710, and is configured to receive a transmittance change value from a user and to transmit a control command to the controller of the smart glass 700 in response thereto.

In addition, the transmittance variable adjustment switch 710 is configured to input a manual mode, an automatic mode, a self-driving mode, or a private mode as a driving environment condition of the smart glass 700.

The navigator 400 is configured to determine a light blocking area located on a driving route of the vehicle. In the case in which the vehicle is near the light blocking area, maximum electric power is applied to the smart glass 700 such that the smart glass 700 is achromatized in the state in which transmittance is the highest.

A tunnel may be confirmed using two methods. A first method is to determine the state before entering the tunnel and the state after entering the tunnel using a GPS system or a navigation system of the vehicle. A second method is to analyze the difference between an ambient light value in front of the auto light sensor and an ambient light value above the auto light sensor in order to determine whether the tunnel has been sensed (before entry) and whether the vehicle has entered the tunnel.

As described above, the smart glass of the present disclosure is configured to control the discoloration of the smart glass based on a driving environment of the vehicle such as the state of a road on which the vehicle is traveling.

In one form, the vehicle including the smart glass 700 may determine a day mode and a night mode. In the case in which the quantity of light introduced from outside is equal to or more than a first reference value DN, it is determined to be the day mode. In the case in which the quantity of light introduced from outside is less than the first reference value DN, it is determined to be the night mode.

In the day mode, the light source is located outside, and therefore the smart glass 700 is basically configured to be discolored. In the night mode, no separate light source is present, and therefore transmittance of the smart glass 700 is controlled in the state in which additional discoloration is impossible.

In the day mode, when the quantity of light introduced from outside is more than a second reference value a", the smart glass is additionally discolored.

Furthermore, in the night mode, when the quantity of light introduced from outside is equal to or less than a third reference value a', electric power is applied to the smart glass 700 such that the smart glass 700 is achromatized.

In the case in which the quantity of light transmitted through the achromatized smart glass 700 is equal to or more than the third reference value a', power is switched to an off state. In the night mode, therefore, achromatization is performed in the case in which the quantity of light introduced is equal to or less than the third reference value a', and achromatization is stopped in the case in which the quantity of light transmitted through the smart glass is more than the third reference value a'.

The third reference value is set as a reference value to achromatize the smart glass 700 based on the quantity of light measured by the auto light sensor 200. Furthermore, the third reference value is set as a reference value of transmittance of light introduced into the smart glass 700 and measured by the ambient light sensor 800.

In brief, in the day mode, in which the light source is present, in the case in which the quantity of light introduced is more than the second reference value a", which is a discoloration criterion, the smart glass 700 is discolored, and in the night mode, in the case in which the quantity of light introduced is equal to or less than the third reference value a', which is an achromatization criterion, the smart glass 700 is achromatized.

Figure 2:
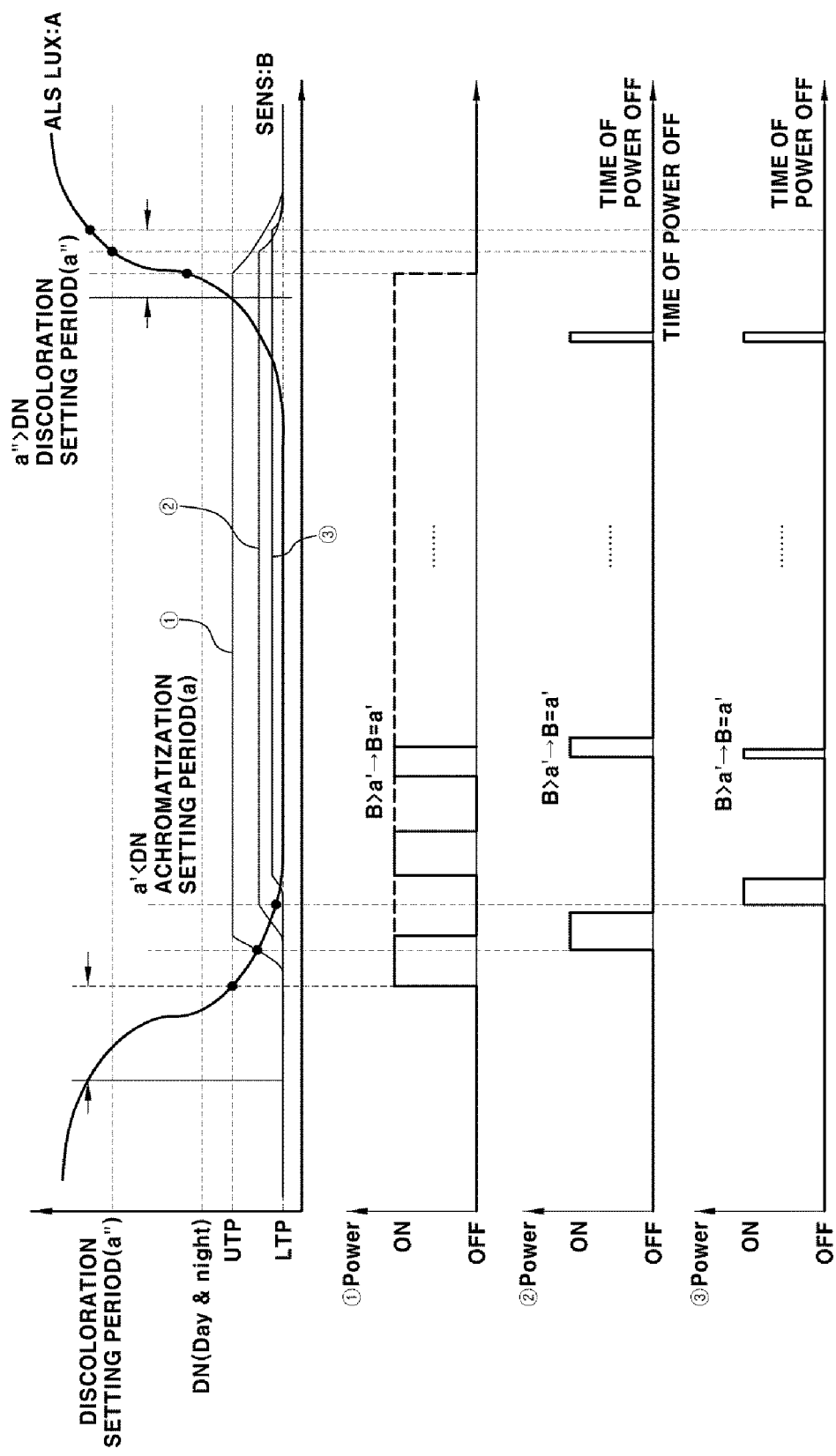
FIG. 2 is a graph showing the relationship between factors for controlling smart glass transmittance.

As another form of the present disclosure, FIG. 2 shows the discoloration criterion and the achromatization criterion of the smart glass 700, which is a graph showing switching between the day mode and the night mode over time.

As shown, in the case in which the quantity of light introduced is equal to or more than the first reference value DN, the day mode is set, and in the case in which the quantity of light introduced is less than the first reference value DN, the night mode is set. The day mode is shown at the front end and the rear end of the graph, and the night mode is shown at the middle of the graph.

Furthermore, the third reference value is set for a discoloration period so as to have larger quantity of light than the first reference value, the second reference value is set for an achromatization period so as to have smaller quantity of light than the first reference value, and a hysteresis period is set between the second reference value and the third reference value (periodic repetition of discoloration and achromatization being limited).

In the hysteresis period, the quantity of light transmitted through the smart glass is maintained at intermediate brightness level MTP, at which discoloration transmittance and achromatization transmittance are intermediate, thereby securing safety. The intermediate brightness level MTP is adjustable within a transmittance range.

Furthermore, the hysteresis period may include a predetermined period in which the smart glass 700 is neither achromatized nor discolored by an external light source and the quantity of light introduced into the smart glass 700, and means a period between high brightness level UTP, at which the quantity of light introduced into the smart glass 700 is large, and low brightness level LTP, at which the quantity of light introduced into the smart glass 700 is small.

In another form of the present disclosure, in the day mode in an automatic mode state, in the case in which the quantity of light introduced exceeds the second reference value a", which is the discoloration criterion, the smart glass 700 is discolored.

In addition, in the case in which the mode is determined to be the night mode in the automatic mode control state, in the case in which the quantity of light introduced is equal to or less than the third reference value a', which is the achromatization criterion, the smart glass 700 is achromatized in order to increase the quantity of light transmitted through the smart glass 700.

In one form of the present disclosure, the control unit 100 may be configured to compare the quantity of light introduced with the discoloration criterion and the achromatization criterion and to perform discoloration and achromatization depending on the driving environment condition.

Furthermore, a construction in which unit-pulse type power is applied in the night mode is shown at the middle region of FIG. 2.

In the night mode, in the case in which the quantity of light transmitted through the smart glass 700 is more than a third reference value a' (the achromatization criterion) in the state in which the quantity of light introduced is equal to or less than the third reference value a', electric power is applied to the smart glass 700 in order to achromatize the smart glass.

Furthermore, in the night mode, in which no external light source is present, it is not possible to selectively discolor the smart glass 700, which is irreversibly discolored compared to the external light source, and therefore pulse power is applied such that the quantity of light transmitted through the smart glass has the same value as an achromatization criterion value.

The quantity of light transmitted through the smart glass 700 is compared with the third reference value a' in order to apply pulse power. That is, in order to perform rapid achromatization, as the third reference value a' approaches the maximum brightness level of the achromatization transmittance, a single relatively long pulse width is increased, whereby the discolored smart glass 700 is rapidly achromatized, and as the third reference value a' approaches the low brightness level of the achromatization transmittance, operation is performed at a short pulse width, whereby power consumption of the vehicle for the same operating time is reduced.

That is, the cycle and intensity of the pulse applied to perform achromatization may vary depending on the difference between the third reference value a' and a range value of light introduced into the smart glass 700.

In one form of the present disclosure, in the case in which the quantity of light transmitted through the achromatized smart glass 700 in the night mode is equal to or more than the third reference value a', application of power is finished. That is, the smart glass 700 is achromatized in order to easily recognize the outside of the vehicle in the state in which no external light source is present (the night mode), and in the case in which the quantity of light transmitted through the smart glass 700 is equal to or more than the third reference value a' after achromatization, power applied to the smart glass 700 is turned off.

In some forms of the present disclosure, the first reference value DN is a reference point to distinguish between day and night and is defined as a value of the quantity of light incident onto the auto light sensor 200 of the vehicle, and the third reference value a' is a reference point of achromatization and is configured to be a value lower than the first reference point as the quantity of light incident onto the auto light sensor 200 of the vehicle.

In addition, the second reference value a" is a reference point of discoloration and is set to a value higher than the first reference point as the quantity of light incident onto the auto light sensor 200 of the vehicle. The quantity B of light measured by the ambient light sensor 800 in the smart glass 700 is measured within a predetermined transmittance range of the smart glass. Values of B are set to high brightness level UTP, low brightness level LTP, and intermediate brightness level MTP. The high brightness level UTP and the low brightness level LTP are fixed variables in the system, and the intermediate brightness level MTP may be set within a range of the fixed variables.

The smart glass set in an automatic mode first determines whether the vehicle has entered a tunnel in order to secure safety of the vehicle. In the case in which the tunnel is sensed or the vehicle has entered the tunnel, maximum power is applied to the smart glass 700 such that the glass is kept maximally bright through continuous application of power.

After the vehicle exits the tunnel, day and night are determined through the first reference value. In the day mode, in the case in which the quantity of light incident through the auto light sensor 200 of the vehicle is more than the second reference value a", the smart glass 700 is automatically discolored, and the operation is finished.

However, in the case which the quantity of light incident through the auto light sensor 200 of the vehicle is less than the second reference value a" after the vehicle exits the tunnel, the quantity of light transmitted through the smart glass 700 is maintained at the intermediate brightness level MTP.

In the night mode, in the case in which the quantity of light introduced into the smart glass 700 having the intermediate brightness level is less than the third reference value a', power is applied to the smart glass 700 in order to achromatize the smart glass.

In the day mode, in the case in which the quantity A of light from outside measured through the auto light sensor 200 is equal to or less than the second reference value a", power is applied, whether the quantity of light introduced into the smart glass 700 is equal to or more than the intermediate brightness level is determined, and upon determining that the quantity of light introduced into the smart glass 700 is equal to or more than the intermediate brightness level, a hysteresis period is set such that the quantity of light introduced through the smart glass 700 is maintained at the intermediate brightness level.

Under the same condition as above, in the case in which a light blocking area is present on a route input into the navigator 400, power is applied to achromatize the smart glass 700. Maximum power is applied to the smart glass 700.

That is, in an area at which a light source is blocked, such as a tunnel, in the case in which the vehicle instantaneously drives to a dark area, it is desired to perform rapid achromatization, and therefore maximum power from a power supply unit 900 is applied to the smart glass 700 in order to rapidly achromatize the smart glass 700.

Figure 3:
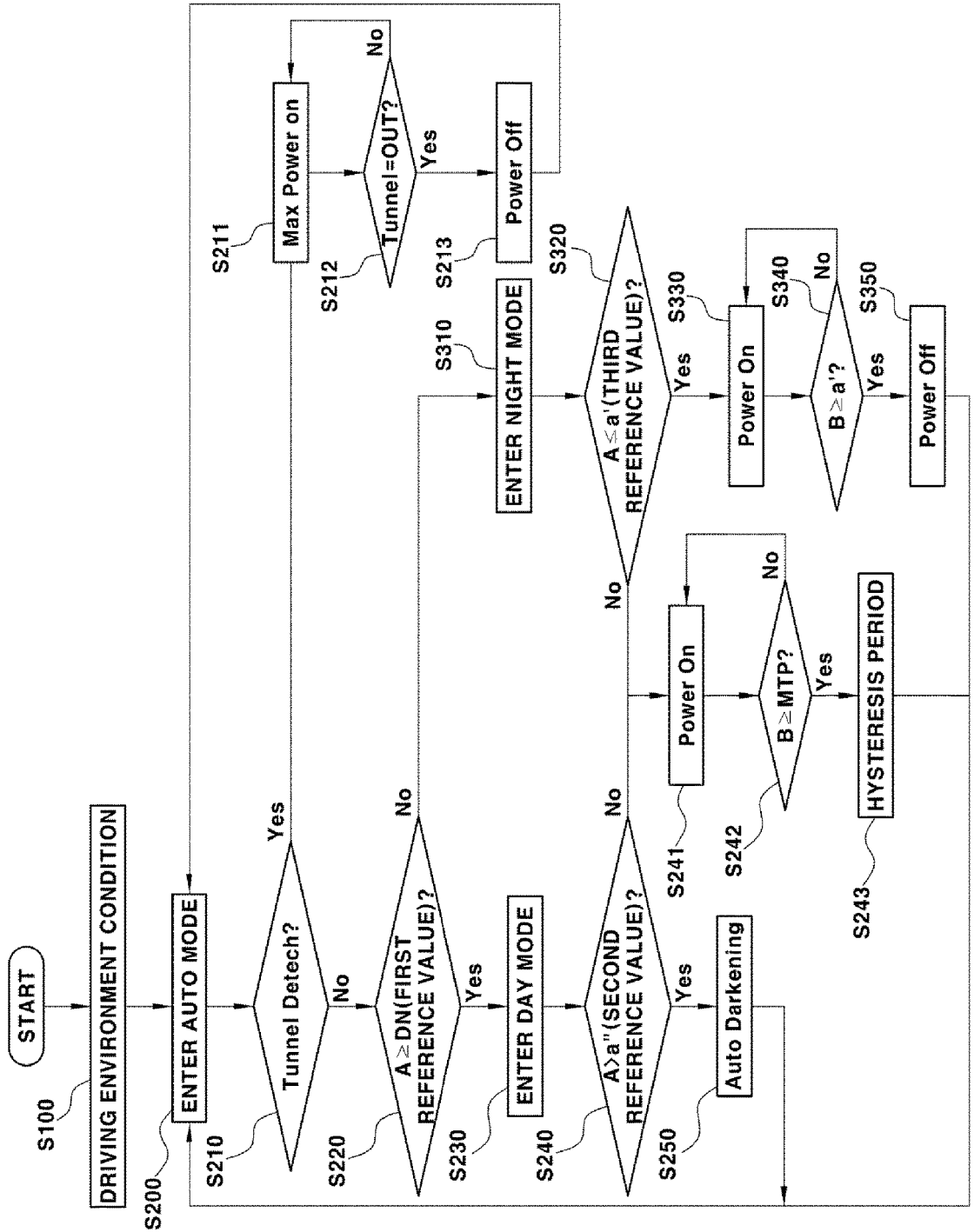
FIG. 3 is a flowchart showing a smart glass transmittance control method according to one form of the present disclosure.

FIG. 3 is a flowchart showing a method of controlling transmittance of the smart glass 700 according to one form of the present disclosure.

As shown, the control unit 100 determines a driving environment condition of the smart glass 700 (S100), and in the case in which the driving environment condition is set to an automatic mode (S200), determines whether a light blocking area is present (S210).

In the case in which no light blocking area is present, the control unit determines whether the quantity of light introduced from outside is equal to or more than a first reference value (S220). The first reference value is a reference value to distinguish between a day mode and a night mode of the smart glass 700 based on the quantity of external light.

In the case in which no light blocking area is present and the quantity of light introduced from outside is equal to or more than the first reference value, the smart glass 700 enters the day mode (S230). The smart glass 700 that has entered the day mode determines whether the quantity of external light exceeds a second reference value a" (S240), and in the case in which the quantity of external light exceeds the second reference value a", the smart glass 700 is discolored (S250).

In the case in which the quantity of external light is equal to or less than the second reference value a" (S240), power is applied to the smart glass 700 (S241), whether the quantity of light transmitted through the smart glass 700 is equal to or more than intermediate brightness level (S242), and in the case in which the quantity of light transmitted through the smart glass 700 is equal to or more than intermediate brightness level, the period is determined to be a hysteresis period (S243).

Unlike this, in the case in which no light blocking area is present and the quantity of light introduced from outside is less than the first reference value, the smart glass 700 enters the night mode (S310).

In the state in which the smart glass 700 has entered the night mode, whether the quantity of external light is equal to or less than a third reference value a' is determined (S320), and in the case in which the quantity of external light is equal to or less than the third reference value a', power from the power supply unit 900 is applied to the smart glass 700 (S330).

In the case in which the quantity of light transmitted through the smart glass 700 achromatized as the result of application of power is equal to or more than the third reference value a' (S340), power is turned off (S350), and in the case in which the quantity of light transmitted through the achromatized smart glass 700 is less than the third reference value a' (S340), power is continuously applied to the smart glass (S330).

The third reference value a' is a reference value to achromatize the smart glass 700. In the case in which the quantity of light applied from outside is small, it is difficult for a user to secure an external field of vision through the achromatized smart glass 700. Consequently, the third reference value a' is a value set to achromatize the smart glass 700.

In addition, in another form of the present disclosure, whether a light blocking area is present is determined (S210), and in the case in which the light blocking area is present, maximum power from the power supply unit 900 is applied to the smart glass 700 in order to achromatize the smart glass 700.

Subsequently, whether the vehicle has exited the light blocking area is determined (S212), and in the case in which the vehicle has exited the light blocking area (S212), power is turned off (S213).

Figure 4:
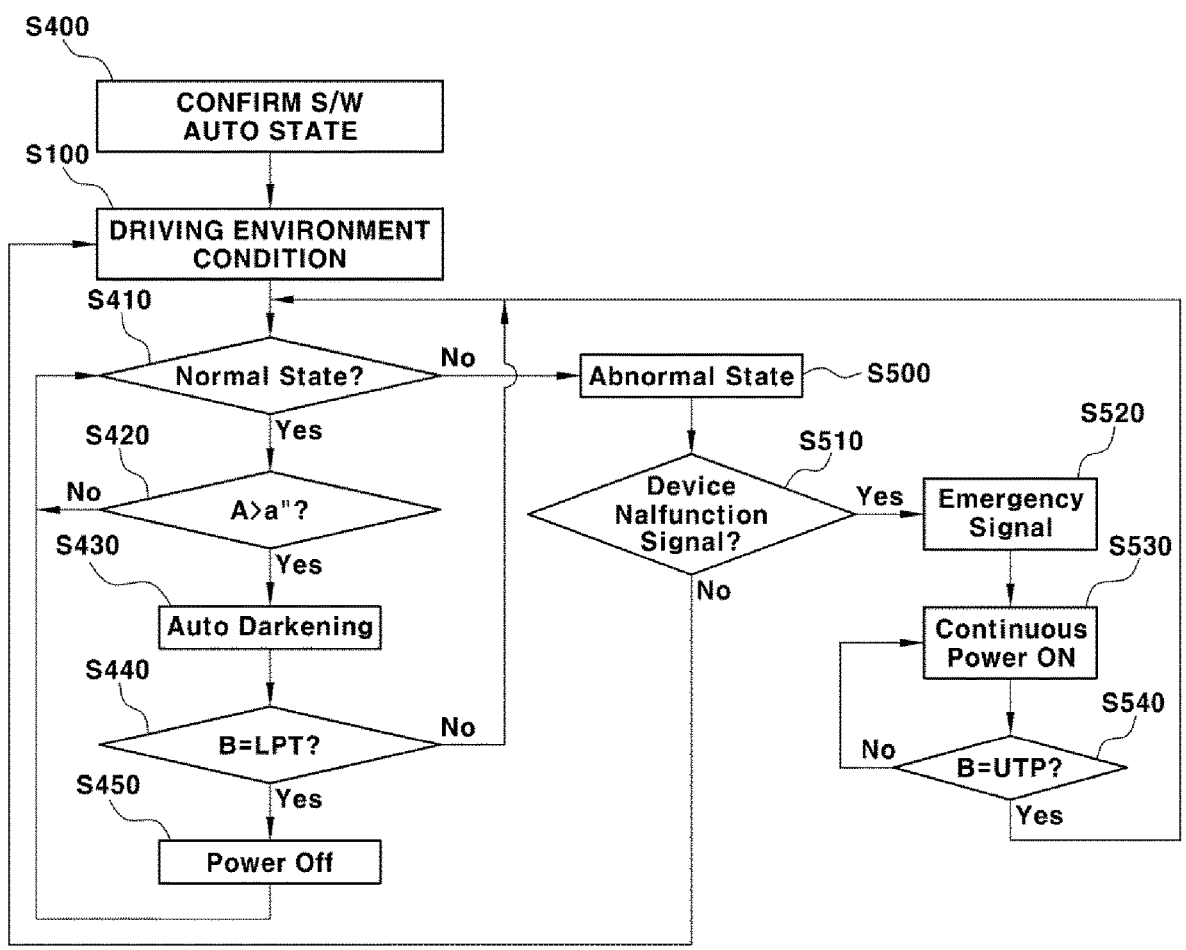
FIG. 4 is a flowchart showing the smart glass transmittance control method in a self-driving or private mode.

FIG. 4 is a flowchart showing another form of the present disclosure in the case in which the driving environment condition is a self-driving or private mode.

Whether the mode input to the transmittance variable adjustment switch 710 or a separate input device according to a user request is an automatic mode is determined (S400), and in addition whether the driving environment condition is a private mode or a self-driving mode is determined (S100).

In the case in which the driving environment condition is a self-driving mode or a private mode in the automatic mode of the smart glass 700 (S100), whether the driving state of the smart glass 700 is normal is determined (S410), and in the case in which the driving state of the smart glass 700 is normal, whether the quantity of external light exceeds the second reference value a" is determined (S420).

In the case in which the quantity of external light exceeds the second reference value a", irreversible discoloration of the smart glass 700 is performed (S430), and whether the transmittance of the smart glass 700 is the lowest brightness level is determined (S440).

Furthermore, in the case in which the transmittance of the discolored smart glass 700 is equal to the lowest brightness level, the power supply unit 900 is turned off (S450).

As described above, transmittance is maintained the lowest in the self-driving mode or the private mode, whereby the smart glass 700 is set such that it is difficult to recognize the interior of the vehicle from outside.

However, at the step of determining the driving state of the smart glass 700, in the case in which the driving state of the smart glass 700 is not normal (S500), whether the smart glass 700 is paled is determined (S510).

In the case in which the smart glass 700 is paled, an emergency signal is applied (S520), and power is continuously applied to the smart glass 700 such that the transmittance of the smart glass 700 is the highest (S540).

That is, in the case in which it is detected that the smart glass 700 is paled, which is a situation in which it is difficult to reflect a user request value, the smart glass 700 is controlled such that the transmittance thereof is maximized, whereby stable driving of the vehicle is performed.

As described above, in the case in which the driving environment condition of the smart glass 700 is the private mode or the self-driving mode, achromatization of the smart glass 700 is prevented even in the case in which no light source is present, whereby the transmittance of the smart glass 700 is maintained low.

Figure 5:
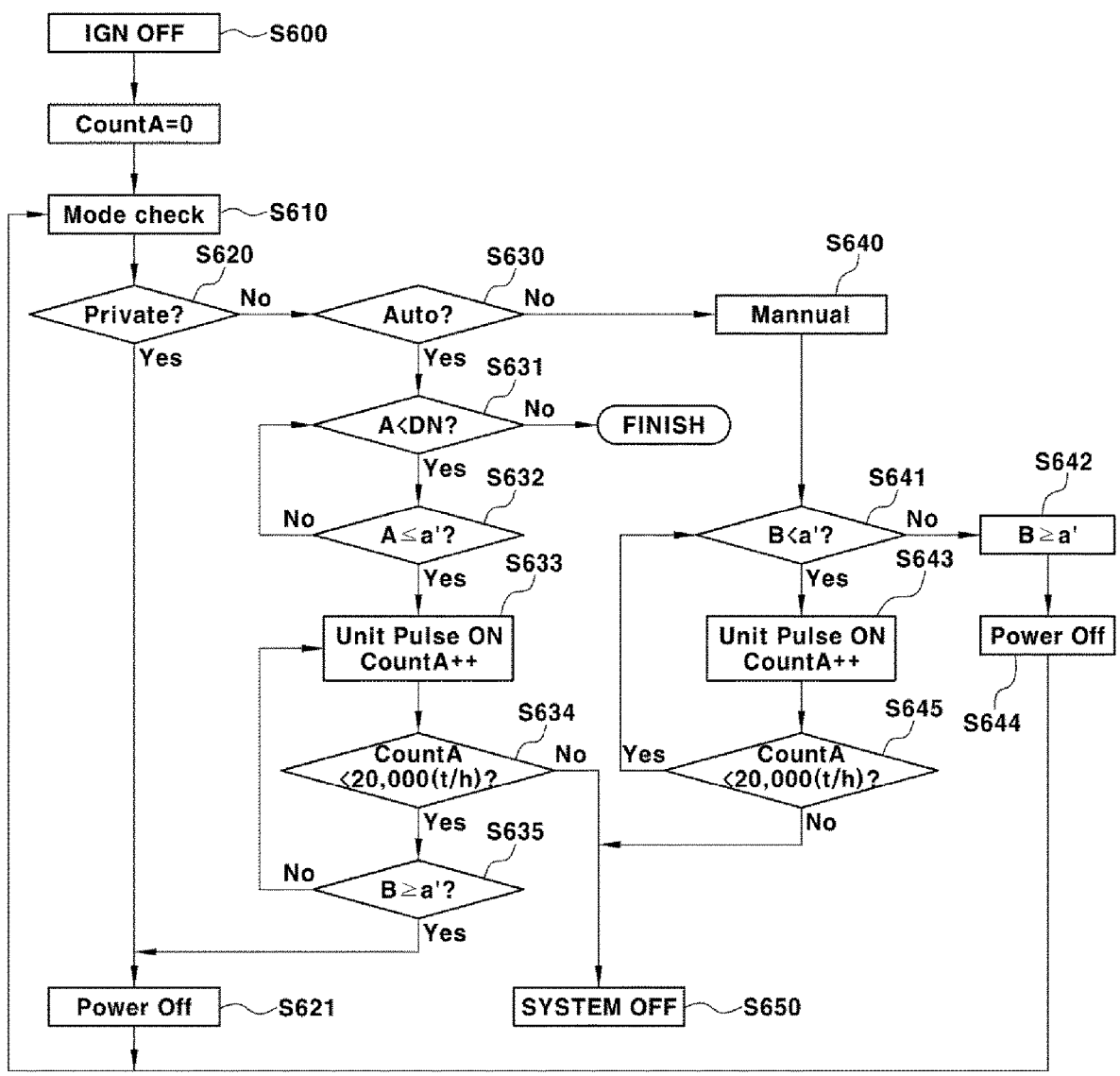
FIG. 5 is a flowchart showing the smart glass transmittance control method in a parked state.

FIG. 5 is a flowchart showing a method of controlling transmittance of the smart glass 700 in a parking condition of the vehicle.

In the case in which the vehicle is turned off as a parking state condition of the vehicle equipped with the smart glass 700 (S600), a count value is set to 0, and the driving environment condition (mode) of the smart glass 700 is confirmed (S610).

In the case in which a private mode is set as the driving environment condition at the time of parking (S620), power is turned off in the state in which vehicle is off, whereby parking is completed without achromatization of the smart glass 700 (S621).

In the case in which the driving environment condition at the time of parking is an automatic mode (S630), however, whether the quantity of external light is less than the first reference value (S631), and in the case in which the quantity of external light is equal to or more than the first reference value, operation is finished in the state in which power is off.

Unlike this, in the case in which the quantity of external light is less than the first reference value (S631), whether the quantity of external light is less than a third reference value a' (S632), and in the case in which the quantity of external light is less than the third reference value a', unit power is applied to the smart glass 700 through the power supply unit 900 (S633).

Furthermore, when the unit power is applied (S633), a set count value is increased, in the case in which the increased count value is less than a predetermined setting value (S634), whether the quantity of light transmitted through the smart glass 700 is equal to or more than the third reference value a' is determined (S635).

In one form of the present disclosure, whether the count value is less than 2000 as the predetermined setting value is determined (S634), and in the case in which the count value is less than 2000 and in the case in which the quantity of light transmitted through the smart glass 700 is equal to or more than the third reference value a' (S635), power is turned off (S621). In the case in which the quantity of light transmitted through the smart glass 700 is not equal to or more than the third reference value a' (S635), unit power is additionally applied to the smart glass 700 (S633).

Whether the count value is less than 2000 as the predetermined setting value is determined (S634), and in the case in which the count value is equal to or more than 2000, additional control is not performed, and the system is turned off in order to prevent power consumption.

In the case in which the driving environment condition is a manual mode (S640), whether the quantity of light transmitted through the smart glass 700 is less than the third reference value a' is determined (S641), and in the case in which the quantity of light transmitted through the smart glass 700 is less than the third reference value a', unit power is additionally applied to the smart glass 700 and at the same time the count value is increased (S643).

Unlike this, in the case in which the quantity of light transmitted through the smart glass 700 is equal to or more than the third reference value a', power is turned off (S644).

In addition, after the unit power is applied to the smart glass 700 and at the same time the count value is increased (S643), in the case in which the count value is less than the predetermined setting value (S645), whether the quantity of light transmitted through the smart glass 700 is less than the third reference value a' is determined again (S641), and in the case in which the count value is equal to or more than the predetermined setting value (S645), the system is turned off (S650).

In conclusion, in the case in which the vehicle is parked in the state in which the smart glass 700 is in the automatic mode, the discoloration of the smart glass is maintained in order to block heat from an external light source in the daytime, and the set transmittance of the smart glass is maintained at night.

In addition, in the case in which the vehicle is parked in the state in which the smart glass 700 is in the manual mode, the smart glass 700 is set in order to maintain transmittance requested by the user.

Furthermore, at each step, unit power is applied to the smart glass 700 while preventing discharge of the battery in order to achromatize the smart glass 700.

Figure 6:
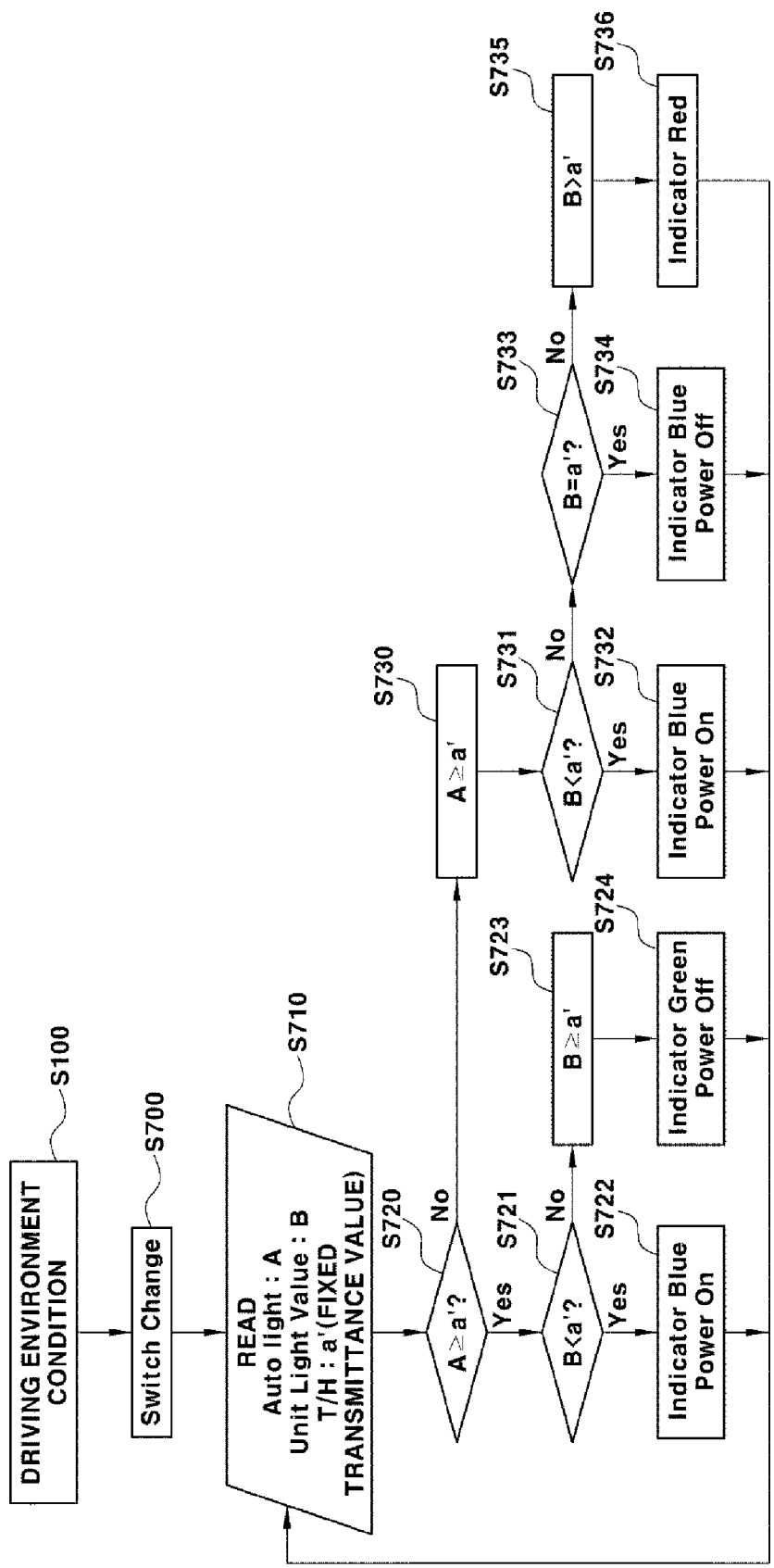
FIG. 6 is a flowchart showing the smart glass transmittance control method in a manual mode.

FIG. 6 is a flowchart showing a method of performing discoloration or achromatization of the smart glass 700 in the state in which a user request for discoloration or achromatization is applied in the case in which the driving environment condition is a manual mode.

In the case in which the driving environment condition of the smart glass 700 is set to a manual mode (S100) and in which switch input is applied according to user input and a discoloration request or an achromatization request (input of a change value) is applied to the control unit 100 (S700), the quantity A of light introduced from outside measured by the auto light sensor 200, transmittance of the smart glass 700 based on the quantity of light introduced into the vehicle measured by the ambient light sensor 800, and a third reference value a' as a fixed transmittance value are set (S710).

Subsequently, whether the quantity of light measured by the auto light sensor 200 is equal to or more than the third reference value a' is determined (S720), and in the case in which the quantity of light is equal to or more than the third reference value a', whether the quantity B of light transmitted through the smart glass 700 is less than the third reference value a' is determined (S721).

In the case in which the quantity of light transmitted through the smart glass 700 is less than the third reference value a', an indicator disposed at a cluster of the vehicle or a position at which user recognition is possible emits blue light, and power is applied to the smart glass 700 (S722). As described above, the indicator, which is an indication device informing that transmittance is being changed to the user request value, emits blue light.

Unlike this, in the case in which the quantity of light transmitted through the smart glass 700 is not less than the third reference value a' (S723), the indicator emits green light, and power is turned off (S724). In the case in which the indicator emits green light, it means that discoloration or achromatization of the smart glass 700 to desired transmittance has been completed.

At the step of determining whether the quantity of light introduced is equal to or more than the third reference value a' (S720), in the case in which the quantity of light introduced is less than the third reference value a' (S730), whether the quantity of light transmitted through the smart glass 700 is less than the third reference value a' is determined (S731).

In the case in which the quantity of light transmitted through the smart glass 700 is less than the third reference value a' (S731), the indicator emits blue light in order to inform that transmittance is being changed to the user request value, and power is applied to the smart glass 700 (S732).

Unlike this, in the case in which the quantity of light transmitted through the smart glass 700 is equal to the third reference value a' (S733), the indicator emits green light in order to inform that discoloration or achromatization of the smart glass 700 to desired transmittance has been completed (S734).

Furthermore, in the case in which the quantity of light transmitted through the smart glass 700 exceeds the third reference value a' (S735), the indicator emits red light in order to inform that approach to the desired transmittance is not possible (S736).

That is, in the case in which the indicator emits red light, it includes the case in which it is requested that discoloration of the smart glass 700 be performed in the state in which no external light source is present. That is, in the case in which no light source is present, this means the case in which further discoloration of the smart glass 700 is not possible due to the feature of the smart glass 700, discoloration of which is performed only in the case in which an external light source is present.

As described above, in the manual mode, achromatization and discoloration of the smart glass 700 are performed according to the user input value. In the case in which no external light source is present, discoloration of the smart glass 700 is not possible due to the feature of the smart glass 700.

As is apparent from the foregoing, the present disclosure may have the following effects.

The present disclosure provides a method of controlling discoloration and achromatization of the smart glass, which is irreversibly discolored by an external light source, whereby it is possible to achieve stable power driving of the vehicle.

In addition, according to the present disclosure, discoloration or achromatization of the smart glass is performed in response to various driving environment conditions, whereby it is possible to easily secure a user's field of view.

The effects of the present disclosure are not limited to those mentioned above. It should be understood that the effects of the present disclosure include all effects that can be inferred from the foregoing description of the present disclosure.

The foregoing describes exemplary forms of the present disclosure. The present disclosure may be used in various different combinations, changes, and environments. That is, variations or modifications can be made within the conceptual scope of the present disclosure, equivalents to the disclosure of the present disclosure, and/or the scope of technology and knowledge in the art to which the present disclosure pertains. Therefore, the above detailed description does not limit the present disclosure disclosed above.

What is claimed is:

1. A method of controlling transmittance of a smart glass of a vehicle, where the smart glass decreases transmittance of the smart glass in response to a quantity of light introduced into the vehicle, the method comprising:
   determining, by a controller of the vehicle, a driving environment condition of the vehicle;
   when the driving environment condition is an automatic mode, determining, by the controller, whether the quantity of light introduced is equal to or greater than a first reference value;
   entering, by the controller, a day mode when the quantity of light introduced is equal to or greater than the first reference value, and determining whether the quantity of light introduced exceeds a second reference value;
   decreasing, by the controller, the transmittance of the smart glass when the quantity of light introduced exceeds the second reference value in the day mode;
   applying, by the controller, electric power to the smart glass when the quantity of light introduced equal to or less than the second reference value in the day mode, and setting a hysteresis period between the second reference value and a third reference value when the transmittance of the smart glass is equal to or greater than a predetermined brightness level;

entering, by the controller, a night mode when the quantity of light introduced is less than the first reference value, and determining whether the quantity of light introduced is equal to or less than the third reference value;

supplying, by the controller, the electric power to the smart glass when the quantity of light introduced is equal to or less than the third reference value in the night mode, and determining whether a quantity of light transmitted through the smart glass is equal to or greater than the third reference value; and stopping the electric power supply to the smart glass, by the controller, when the quantity of light transmitted through the smart glass is equal to or greater than the third reference value.

2. The method according to claim 1, wherein applying the electric power to the smart glass comprises applying the electric power to the smart glass in a pulse form when the quantity of light introduced is equal to or less than the third reference value.

3. The method according to claim 1, wherein determining the driving environment condition of the smart glass comprises:
    determining whether an external light blocking area is present on a driving route of the vehicle; and
    applying maximum power to the smart glass when the external light blocking area is present on the driving route.

4. The method according to claim 1, wherein determining the driving environment condition of the smart glass comprises:
    when the driving environment condition is a self-driving mode or a private mode, determining whether the quantity of light introduced exceeds the second reference value; and
    when the quantity of light introduced exceeds the second reference value, determining whether the transmittance of the smart glass is a lowest brightness level.

5. The method according to claim 4, wherein the electric power is turned off when the transmittance of the smart glass is the lowest brightness level.

6. The method according to claim 1, wherein determining the driving environment condition of the smart glass comprises:
    determining whether paling is sensed by at least one of the smart glass or a light quantity sensor; and
    when the paling is sensed, applying the electric power to switch the transmittance of the smart glass to a highest state.

7. The method according to claim 6, wherein determining whether paling is sensed comprises generating a paling signal when the paling is sensed.

8. The method according to claim 1, wherein the driving environment condition is measured using at least one of an auto light sensor, a rain sensor, a navigator, or an ambient light sensor located inside the smart glass.

9. A method of controlling transmittance of a smart glass of a vehicle, where the smart glass decreases transmittance of the smart glass in response to a quantity of light introduced into the vehicle, the method comprising:
    determining, by a controller of the vehicle, a driving environment condition of the vehicle;
    when the driving environment condition is an automatic mode, determining, by the controller, whether the quantity of light introduced is equal to or greater than a first reference value;
    entering, by the controller, a day mode when the quantity of light introduced is equal to or greater than the first reference value, and determining whether the quantity of light introduced exceeds a second reference value;
    decreasing, by the controller, the transmittance of the smart glass when the quantity of light introduced exceeds the second reference value in the day mode; and
    applying, by the controller, electric power to the smart glass when the quantity of light introduced equal to or less than the second reference value in the day mode, and setting a hysteresis period between the second reference value and a third reference value when the transmittance of the smart glass is equal to or greater than a predetermined brightness level,
    wherein determining the driving environment condition of the smart glass comprises:
    determining whether the driving environment condition is a parked state in the automatic mode;
    determining whether the quantity of light introduced in the automatic mode is less than the first reference value and is equal to or less than a third reference value;
    when the quantity of light introduced is less than the first reference value and is equal to or less than the third reference value, applying the electric power to the smart glass;
    when the quantity of light transmitted through the powered smart glass is equal to or greater than the third reference value, turning the electric power off; and
    when the quantity of light transmitted through the powered smart glass is less than the third reference value, continuously applying the electric power to the smart glass.

10. A method of controlling transmittance of a smart glass of a vehicle, where the smart glass decreases transmittance of the smart glass in response to a quantity of light introduced into the vehicle, the method comprising:
    determining, by a controller of the vehicle, a driving environment condition of the vehicle;
    when the driving environment condition is an automatic mode, determining, by the controller, whether the quantity of light introduced is equal to or greater than a first reference value;
    entering, by the controller, a day mode when the quantity of light introduced is equal to or greater than the first reference value, and determining whether the quantity of light introduced exceeds a second reference value;
    decreasing, by the controller, the transmittance of the smart glass when the quantity of light introduced exceeds the second reference value in the day mode; and
    applying, by the controller, electric power to the smart glass when the quantity of light introduced equal to or less than the second reference value in the day mode, and setting a hysteresis period between the second reference value and a third reference value when the transmittance of the smart glass is equal to or greater than a predetermined brightness level,
    wherein determining the driving environment condition of the smart glass comprises:
    when the driving environment condition is a manual mode, determining whether a user switch input is detected;

when the user switch input is detected, determining whether the quantity of light introduced is equal to or greater than a third reference value;

when the quantity of light introduced is equal to or greater than the third reference value, determining whether the quantity of light transmitted through the smart glass is less than the third reference value; and when the quantity of light transmitted through the smart glass is less than the third reference value, applying the electric power to the smart glass.

11. The method according to claim 10, further comprising: turning the electric power off when the quantity of light transmitted through the smart glass is equal to or more than the third reference value.

12. The method according to claim 10, further comprising: when the quantity of light transmitted through the smart glass is equal to the third reference value, turning the electric power off.

13. The method according to claim 10, wherein determining whether the quantity of light transmitted through the smart glass is less than the third reference value comprises: displaying an impossibility of execution when the quantity of light transmitted through the smart glass exceeds the third reference value.

\* \* \* \* \*